(No Model.)

J. A. PRIEST.
ARTIFICIAL TOOTH.

No. 310,849. Patented Jan. 13, 1885.

WITNESS
Wm H Symonds
John E. Franklin

INVENTOR
James A Priest

UNITED STATES PATENT OFFICE.

JAMES A. PRIEST, OF UTICA, NEW YORK.

ARTIFICIAL TOOTH.

SPECIFICATION forming part of Letters Patent No. 310,849, dated January 13, 1885.

Application filed April 18, 1884. (No model.)

*To all whom it may concern:*

Be it known that I, JAMES A. PRIEST, of the city of Utica, county of Oneida and State of New York, have invented a new and useful Improvement in Artificial Teeth; and I do hereby declare the following to be a clear and exact description of the nature thereof, sufficient to enable others skilled in the art to which my invention appertains to fully understand, make, and use the same, reference being had to the accompanying drawings, making part of this specification, in which—

Letter A represents two thin perforated folded or unfolded pieces or strips of platinum, and B represents a porcelain molar tooth.

Figure 1:
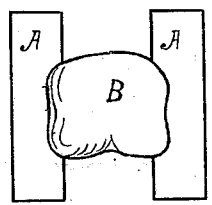
Figure 2:
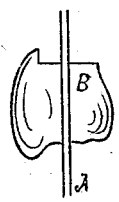
Figure 3:
Figure 4:
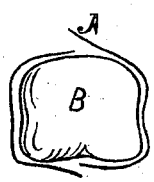
Figure 7:
Figure 5:
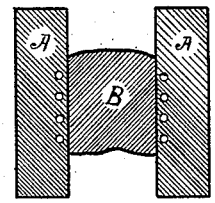
Figure 6:
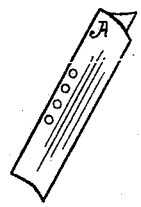

Figure 1 is a face view of an upper molar tooth, with folded or unfolded perforated plates or strips of platinum embedded in the lateral sides of the tooth, and also shows the form in which the tooth will be left by the manufacturer. Fig. 2 is a side view of the same. Fig. 3 is a bottom view of the same. Fig. 4 is a front view of the tooth, showing the manner in which the platinum may be folded over the top, bottom, and sides of the tooth by the operator previous to soldering. Fig. 5 is a horizontal section of the tooth, showing the manner in which the pieces or plates of platinum are connected with or embedded in the porcelain tooth. Fig. 6 is a perspective view of one of the folded and perforated plates or pieces of platinum. Fig. 7 represents three teeth soldered together and made fast to a molar root, showing the manner of making or forming what is called in dentistry "bridge-work."

The object of my invention is to produce an improved artificial porcelain tooth for crowning, bridge, and plate work, combining great strength with simplicity of construction and convenience of attachment. This is accomplished by providing a porcelain tooth with projecting platinum strips of single or double thickness, the inner edges of said strips being perforated and embedded in the tooth before it is baked, so that the porcelain will penetrate the perforations and hold the strips firmly in position. In this form, as shown in Figs. 1, 2, and 3, the teeth are furnished to the trade. The projecting platinum strips are folded back around the tooth, as shown in Figs. 4 and 7, by the operator, and, after being burnished down, afford a bearing-surface for the solder, by which the teeth are connected to each other and to the roots or to a plate, as the case may be. The platinum strips A are either folded or unfolded, and of a length sufficient to enable them to extend above and below the tooth B before being folded around the same; and the central portion of the inner edge of each strip is perforated, as shown in Fig. 5, to afford a firmer hold for the porcelain. Before the porcelain teeth are baked the strips A are inserted in each side, as shown, a sufficient portion of each strip being caused to extend above and below each tooth, so that when the strips are folded back the ends as well as the sides of the tooth will be covered, thereby greatly strengthening the tooth, besides affording a means for its attachment. The platinum, being malleable, can be readily burnished over the sides, under surface, and cutting or grinding edge of the tooth, thereby completely covering it, with the exception of the face and inner side, effectually protecting it against the strain consequent on biting, and greatly lessening the liability of breakage. This construction admits of the teeth being soldered together in a continuous line or rim of from two to fourteen teeth, which are easily made fast to the roots in the mouth, thus forming an artificial denture of great simplicity, convenience, and strength.

I am aware that artificial teeth have been connected by pins which were embedded in the substance of the tooth and bent over so as to hold platinum plates placed between the teeth; but this I do not claim. Such plates and pins are mere connections for the artificial denture, and do not extend over the sides, under surface, and crown of the tooth, so as to strengthen the same, as my platinum strips are designed to do.

Having thus described my invention, what I claim as new, and desire to secure by Letters Patent, is—

An artificial tooth provided on each side with a vertical strip of platinum, the inner edges of said strips being perforated and embedded in the substance of the tooth, and the said strips being extended above and below the tooth, and adapted to form a covering for the sides, under surface, and crown, and a means of attachment by soldering, substantially as described.

JAMES A. PRIEST.

Witnesses:
JOHN E. FRANKLIN,
WILLIAM T. HALLEDAY.